United States Patent
Funakoshi

(10) Patent No.: US 7,003,505 B1
(45) Date of Patent: Feb. 21, 2006

(54) INFORMATION RETRIEVING APPARATUS AND METHOD THEREFOR, AND MEMORY MEDIUM STORING PROGRAM THEREFOR

(75) Inventor: Masanobu Funakoshi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/491,867

(22) Filed: Jan. 27, 2000

(30) Foreign Application Priority Data

Jan. 29, 1999 (JP) .......................................... 11-021671

(51) Int. Cl.
*G06F 17/30* (2006.01)

(52) U.S. Cl. ..................... 707/1; 707/3; 707/4; 707/5
(58) Field of Classification Search ................. 707/1, 707/2, 3, 10, 4, 5; 704/233, 521; 345/838, 345/837; 382/345, 304
See application file for complete search history.

(56) References Cited

U.S. PATENT DOCUMENTS

| | | | | | |
|---|---|---|---|---|---|
| 5,761,655 | A | * | 6/1998 | Hoffman ........................ | 707/4 |
| 5,787,414 | A | * | 7/1998 | Miike et al. ................... | 707/2 |
| 5,857,185 | A | * | 1/1999 | Yamaura ....................... | 707/5 |
| 5,943,669 | A | * | 8/1999 | Numata ......................... | 707/5 |
| 5,987,460 | A | * | 11/1999 | Niwa et al. .................... | 707/6 |
| 6,154,737 | A | * | 11/2000 | Inaba et al. ................... | 707/3 |
| 6,202,072 | B1 | * | 3/2001 | Kuwahara .................... | 707/513 |
| 6,243,093 | B1 | * | 6/2001 | Czerwinski et al. ......... | 345/848 |
| 6,292,164 | B1 | * | 9/2001 | Soohoo ........................ | 345/660 |
| 6,466,237 | B1 | * | 10/2002 | Miyao et al. ................ | 345/838 |
| 6,556,723 | B1 | * | 4/2003 | Craver et al. ................ | 382/294 |
| 6,564,206 | B1 | * | 5/2003 | Ikeda ........................... | 707/3 |
| 6,704,446 | B1 | * | 3/2004 | Shigeta et al. ............... | 382/168 |

\* cited by examiner

*Primary Examiner*—Jean M. Corrielus
*Assistant Examiner*—Baoquoc N To
(74) *Attorney, Agent, or Firm*—Fitzpatrick, Cella, Harper & Scinto

(57) ABSTRACT

In an information retrieval apparatus for retrieving, from a database, information of a predetermined number in the descending order to degree of matching with the entered retrieving condition, in displaying the images corresponding to the results of retrieval, the size and position of the image are so determined that the image becomes larger in size and closer to the center of the display unit with a higher degree of matching whereby the degree of matching can be directly understood. Also within the positions of a same distance from the center, the display position is so determined as to minimize the overlapping with other results of retrieval whereby the results can be displayed in an easily observable manner.

23 Claims, 9 Drawing Sheets

FIG. 4

| BASIC I/O PROGRAM |
| :---: |
| OS |
| MEDIA RETRIEVAL PROCESS PROGRAM |
| RELATED DATA |
| WORK AREA |

FIG. 5

| RANK | MATCHING DEGREE | DATA ID |
| :---: | :---: | :---: |
| 1 | 80 | 21365 |
| 2 | 75 | 90235 |
| ⋮ | ⋮ | ⋮ |
| 10 | 35 | 38106 |

FIG. 6

| DATA ID | DISPLAY COORDINATES | DISPLAY SIZE |
| :---: | :---: | :---: |
| 21365 | (0, 200) | 360×240 |
| 90235 | (−200, −300) | 300×200 |
| ⋮ | ⋮ | ⋮ |

INFORMATION RETRIEVING APPARATUS AND METHOD THEREFOR, AND MEMORY MEDIUM STORING PROGRAM THEREFOR

BACKGROUND OF THE INVENTION

1. Field of the Invention

The present invention relates to an information retrieving apparatus for retrieving information from a database based on entered retrieving condition, a method therefor, and a memory medium storing a program therefor.

2. Related Background Art

With the recent advancement of internet, various media data such as text, image and sound are digitized into easily processable forms on the net and are publicized on the internet. Such media data still continue to increase at present.

In such situation, the media retrieving technology for retrieving necessary data from the media data of enormous amount is being considered more and more important, and there are being introduced the media retrieving systems with the interface easier to use.

For example there is known an image retrieving system utilizing the natural language as the input.

In this system, each image data and language information indicating the content thereof are stored, in one-to-one correspondence, in an image database, and, when a simple query sentence is entered with the natural language ordinarily used by the user, such query sentence is subjected to language analysis and matched with the language information in the image database whereby the image data searched by the user is retrieved by a natural interface.

In such image retrieving system, it is common to output plural images, obtained as the result of retrieval, arranged two-dimensionally in equal sizes.

However, such media retrieving system, designed to output the obtained plural media in uniformly arranged manner, has been associated with a drawback that the level of matching between the language information correlated with each medium and the query sentence is difficult to judge.

SUMMARY OF THE INVENTION

In consideration of the foregoing, an object of the present invention is to provide a media retrieval system capable of outputting media in such a manner that the level of matching between the language information on each media and the query sentence is readily understandable to the user.

Another object of the present invention is, in case of output by display, to arrange the results of retrieval so as to reduce the overlapping thereof, thereby achieving easily observable display.

According to one aspect, the present invention which achieves these objectives relates to an information retrieving apparatus comprising a database storing information to be retrieved; input means for entering retrieval condition; calculation means for calculating the degree of matching between the retrieving condition and each information to be retrieved in the database; determination means for determining, on the results of retrieval respectively for the plural information to be retrieved of a high degree of coincidence, the output feature amount of each result of retrieval according to each degree of coincidence; and output means for outputting the results of retrieval with an output mode based on each output feature amount.

According to another aspect, the present invention which achieves these objectives relates to an information retrieving method comprising an input step of entering retrieval condition; a calculation step of calculating the degree of coincidence between the retrieving condition and each information to be retrieved in a database storing the information to be retrieved; a determination step of determining, on the results of retrieval respectively for the plural information to be retrieved of a high degree of coincidence, the output feature amount of each result of retrieval according to each degree of coincidence; and an output step of outputting the results of retrieval with an output mode based on each output feature amount.

According to still another aspect, the present invention which achieves these objectives relates to a computer readable storage medium storing an information retrieval program for controlling a computer to perform information retrieval, the program comprising codes for causing the computer to perform an input step of entering retrieval condition; a calculation step of calculating the degree of coincidence between the retrieving condition and each information to be retrieved in a database storing the information to be retrieved; a determination step of determining, on the results of retrieval respectively for the plural information to be retrieved of a high degree of coincidence, the output feature amount of each result of retrieval according to each degree of coincidence; and an output step of outputting the results of retrieval with an output mode based on each output feature amount.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a view showing a RAM memory map under program execution;

FIG. 5 is a view showing an example of the configuration of a matching result buffer RBUF;

FIG. 6 is a view showing an example of the configuration of display data VDATA;

DESCRIPTION OF THE PREFERRED EMBODIMENTS

Now a preferred embodiment of the present invention will be clarified in detail, with reference to the attached drawings.

First Embodiment

In the following a first embodiment of the present invention will be clarified in detail with reference to the attached drawings.

Figure 1:
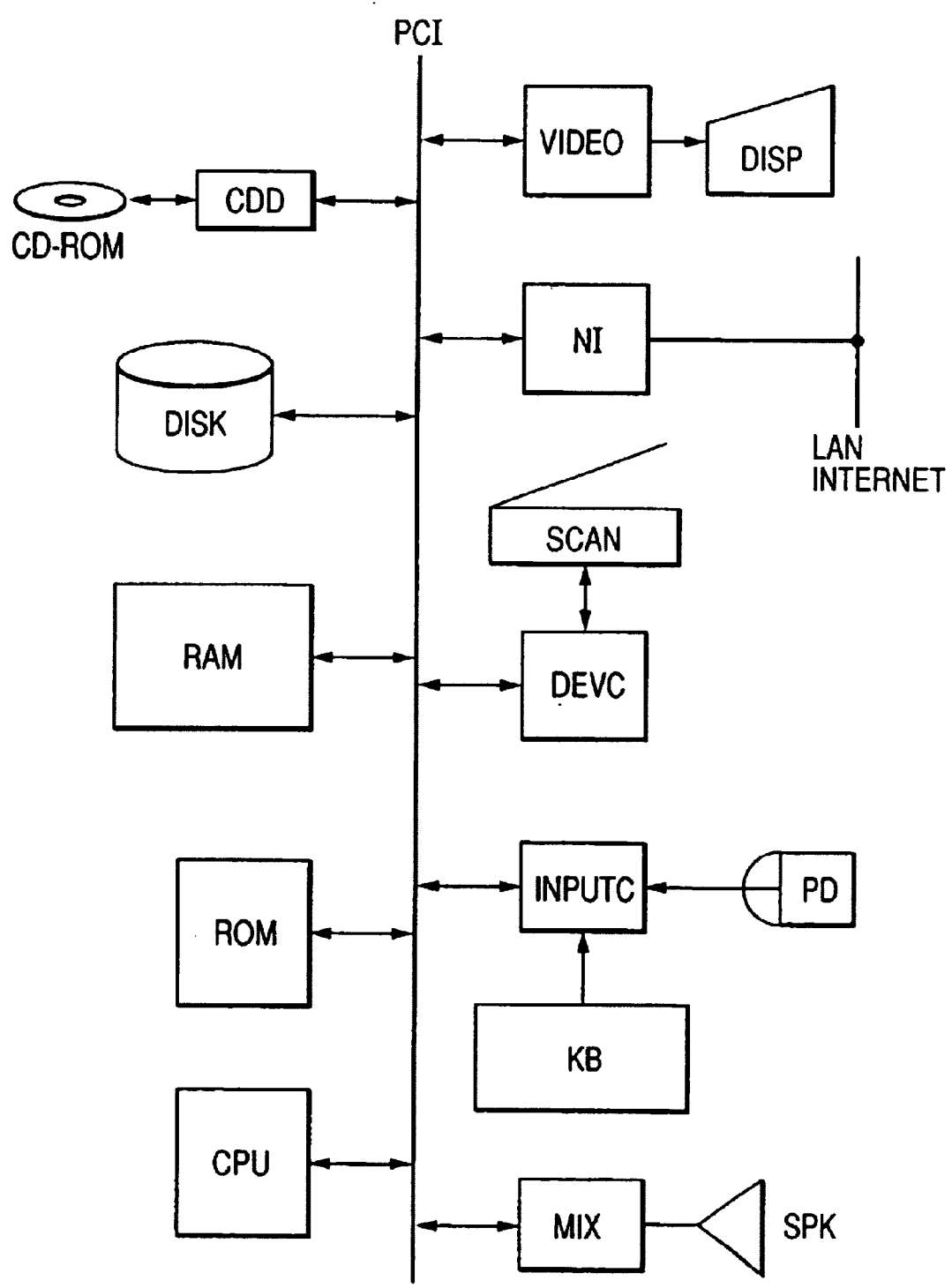
FIG. 1 is a block diagram showing the configuration of an information retrieving system embodying the present invention.

FIG. 1 is a block diagram of the information retrieval apparatus of the present embodiment.

Referring to FIG. 1, a microprocessor CPU executes calculations and logic judgments for the media retrieval process and controls various components connected through a PCI bus PCI.

A PCI bus PCI transfers an address signal indicating the component to be controlled by the microprocessor CPU, also transfers a control signal for the component to be controlled by the microprocessor CPU and executes data transfer between the components.

A fixed read-only memory ROM stores a basic I/O program in the present embodiment.

A random access memory RAM accepting data writing is used for temporary storage of various data from the components and for reading a program describing various processes in the present embodiment, for the CPU to execute various processes based on such program.

A CD-ROM drive CDD is used for loading a program or data recorded on a CD-ROM into the system.

An input controller INPUTC transmits an input signal, supplied from a keyboard KB or a pointing device PD, after suitable conversion to the CPU through the PCI bus PCI.

A keyboard KB is provided with character/symbol input keys such as alphabet keys, hiragana keys, katakana keys, and various functions keys such as a cursor movement key for instructing the cursor movement.

A pointing device PD, consisting for example of a mouse or a track ball, is used for indicating a cursor or a button on the display image.

An external memory DISK is used for storing data or a program. The data, program etc. are stored when necessitated and are recalled when required. The media database in the present embodiment is principally loaded on the DISK.

A video controller VIDEO is used for storing display data through the PCI bus PCI, and such data are converted into a display signal and supplied to a display device DISP.

A display device DISP is composed for example of a cathode ray tube or a liquid crystal display unit and is used for displaying the result of various processes, status of the apparatus and a message to the user.

A device controller DEVC controls devices connected thereto under the instruction of the CPU, transmitted through the PCI bus PCI, and suitably transmits signals and data from the connected device to the CPU or the DISK through the PCI bus PCI.

A scanner SCAN optically scans an original set thereon under the instruction from the DEVC, thereby reading the original image for supply to the DEVC.

A network interface NI is used for connecting the media retrieval system of the present embodiment with an external system through a LAN or internet. The media retrieval system of the present embodiment can exchange signals and data with the external system through such connection.

A mixer MIX synthesizes and converts audio output data supplied thereto through the PCI bus PCI into an audio output signal for supply to a speaker SPK.

A speaker SPK outputs result of the process, status of the apparatus, message to the user, music etc. by sound signals.

The media retrieval apparatus of the present embodiment, composed of the above-described components, function according to various inputs from the keyboard KB or the pointing device PD, and, when an input therefrom is entered, an interruption signal is supplied through the input controller INPUTC to the microprocessor CPU, which in response reads various control signals stored in the ROM whereby various controls are executed according to such control signals.

The system of the present embodiment functions by the execution, by the CPU, of a basic I/O program, an OS and a media retrieval process program. The basic I/O program is stored in the ROM while the OS is stored in the DISK. When the power supply of the present system is turned on, the OS is read from the DISK into the RAM by the IPL (initial program loading) function of the basis I/O program, whereby the function of the OS is initiated.

In the present embodiment, the media retrieval process program and related data are recorded in the CD-ROM. This media retrieval process program contains program codes corresponding to the process steps of flow charts shown in FIGS. 8 to 12.

Figure 2:
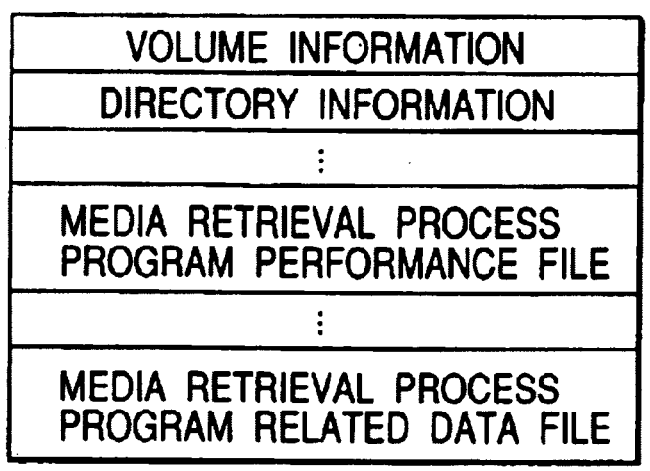
FIG. 2 is a view showing an example of the content of a CD-ROM.

FIG. 2 is a view showing the configuration of the content of the CD-ROM containing the media retrieval process program and related data. As shown in FIG. 2, the CD-ROM records volume information and directory information of the CD-ROM in a header area thereof, and thereafter records the media retrieval process program and the related data which are the contents of the CD-ROM.

Figure 3:
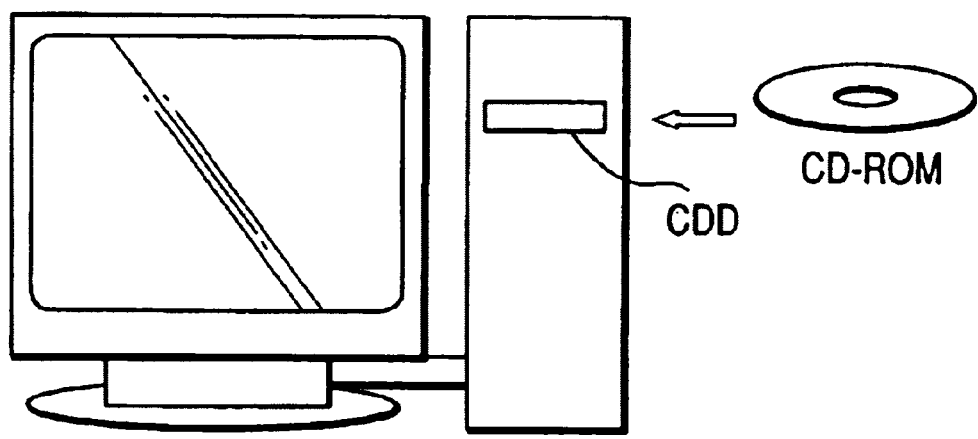
FIG. 3 is a schematic view showing a media retrieving apparatus and a program medium therefor.

FIG. 3 is a schematic view of the present system and the CD-ROM storing the media retrieval process program. The media retrieval process program and the related data, recorded in the CD-ROM, and be loaded into the present system through the CD-ROM drive CDD as shown in FIG. 3. When the CD-ROM is set on the CD-ROM drive CDD, the media retrieval process program and the related data are read from the CD-ROM under the control of the OS and the basic I/O program and are enabled by loading in the RAM.

FIG. 4 shows a memory map in a state where the media retrieval process program is loaded in the RAM and enabled.

In this state, the work area of the RAM contain a matching result buffer RBUF, a result output number COUNT, media display data VDATA, and a display base size VBASE.

FIG. 5 shows an example of the configuration of the matching result buffer RBUF in the present embodiment.

The matching result buffer RBUF in the present embodiment stores, among the data retrieved in the language matching retrieval process, the data by the result output number COUNT in the descending order of the matching degree. FIG. 5 shows an example of the configuration of the matching result buffer RBUF in case the result output number COUNT=10.

As shown in FIG. 5, a matching result data is composed of a rank, a matching degree and a media ID. The rank means the number in the descending order of matching degree among the data stored in the matching result buffer RBUF. The matching degree means the level of matching between the language information correlated with each media data and the analysis result of query, and is represented by percentage. The data ID is the ID of the data stored in the media database of the present embodiment, and can be utilized for reading the actual media data or the corresponding language information.

FIG. 6 is a view showing an example of the configuration of the media display data VDATA in the present embodiment.

The media display data VDATA in the present embodiment contains the data ID, display coordinate and display size, with respect to the media data already displayed on the media display unit of the display device DSP. The display coordinate is the coordinates in a coordinate system having a horizontal X-axis which is positive at the right, a vertical Y-axis which is positive at above and an original point at the center of the media display unit in the present embodiment, and is represented by the unit of a dot. The display size is also represented by the unit of a dot, and, in FIG. 6, is given by the length in the direction of X-axis times the length in the direction of Y-axis. The media display data VDATA is used for minimizing the mutual overlapping of the media, at the display thereof, as will be explained later.

Figure 7:
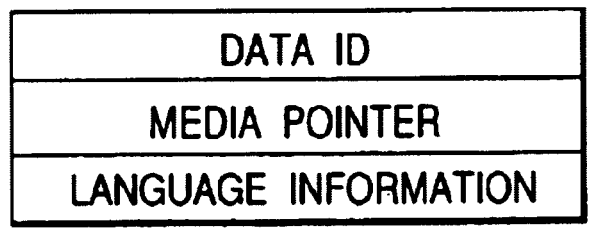
FIG. 7 is a view showing an example of the configuration of single data in the media database.

FIG. 7 shows an example of the configuration of a data structure stored in the media database of the present embodiment.

As shown in FIG. 7, the data in the media database of the present embodiment is composed of a data ID, a media pointer, and a language information. The data ID is an index number of the data structure itself. The media pointer is a pointer indicating the actual media data and can be used for making access to the actual media data. The language information indicates the content of the media data, and is stored, in the present embodiment, in a format easy to use in the language matching process to be explained later. Such data structure allows to execute high-speed retrieval without making access to the actual media data.

The function of the above-described media retrieval program will be explained with reference to flow charts.

Figure 8:
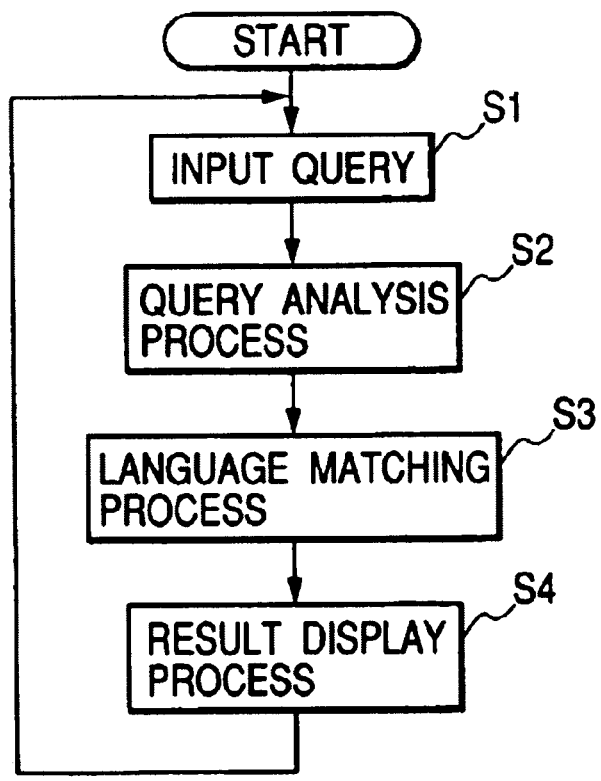
FIG. 8 is a flow chart showing the sequence of media retrieving process.

FIG. 8 is a flow chart of the entire media retrieval program of the present embodiment.

A step S1 is a query input process in which a query (question sentence) for retrieving media is entered by the user. The query is a simple sentence representing the content of the media requested by the user, for example "a red sports car". Such process is already known in the ordinary retrieving process and will not be explained further. After the process, the sequence proceeds to a step S2.

A step S2 is a query analysis process for executing language analysis of the query entered in the step S1. In this process, the query entered in the step S1 is subjected to language process such as form element analysis, structure analysis, meaning analysis etc. for conversion into language information of a format easily usable in the ensuing processes. Such process is already known in the ordinary language process and will not be explained further. After the process, the sequence proceeds to a step S3.

A step S3 is a language matching process for matching the language information of the query obtained in the step S2 with the language information in the media database, thereby retrieving the media looked for by the user. As a result of this process, the matching result buffer RBUF stores, among the data in the database, the matching result data by the result output number COUNT, in the descending order of the matching degree. Such process is already known in the ordinary database retrieving process and will not be explained further. After the language matching process, the sequence proceeds to a step S4.

A step S4 is a result display process of outputting media to the display as the result of retrieval, based on the matching result data in the matching result buffer RBUF obtained in the step S3. This process will be explained later with reference to FIG. 9. After the process, the sequence proceeds to the step S1.

Figure 9:
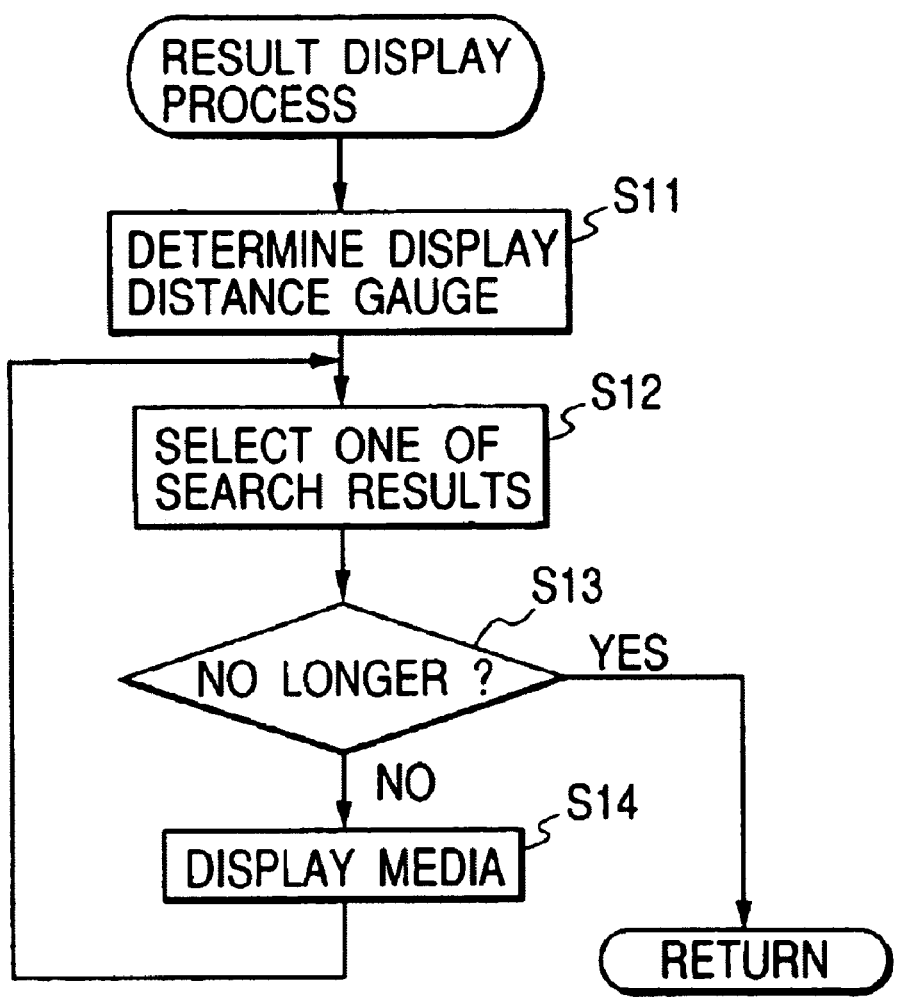
FIG. 9 is a flow chart showing the sequence of result display process.

FIG. 9 is a flow chart showing the details of the result display processes in the step S4 of the present embodiment.

At first a step S11 executes a process of determining the gauge of display distance on the display unit, starting from the lowest matching degree among the matching results stored in the matching result buffer RBUF. As the original point of the display coordinate of the present embodiment is at the center of the horizontal and vertical lengths of the display unit, a gauge from 100 to the "lowest matching degree −10" is so assigned to the dot number obtained by bisecting the longer side, which is the vertical or horizontal length of the display unit. The lowest matching degree is selected as −10, in order to secure a space for displaying the media of the data actually having the lowest matching degree. After the process, the sequence proceeds to a step S12.

Then a step S12 selects one of the matching results stored in the matching result buffer RBUF. In the present embodiment, the selection is made from the top of the matching result buffer RBUF. Such process is already known and will not be explained in more details. After the process, the sequence proceeds to a step S13.

Then a step S13 checks whether the result data selected by the step S12 exists. If the result data no longer exists, the result display process is terminated, but, if it exists, the sequence proceeds to a step S14.

A step S14 is a media display process for displaying the media on the display, based on the selected result data. This process will be explained later with reference to FIG. 10. After the process, the sequence proceeds to the step S12.

Figure 10:
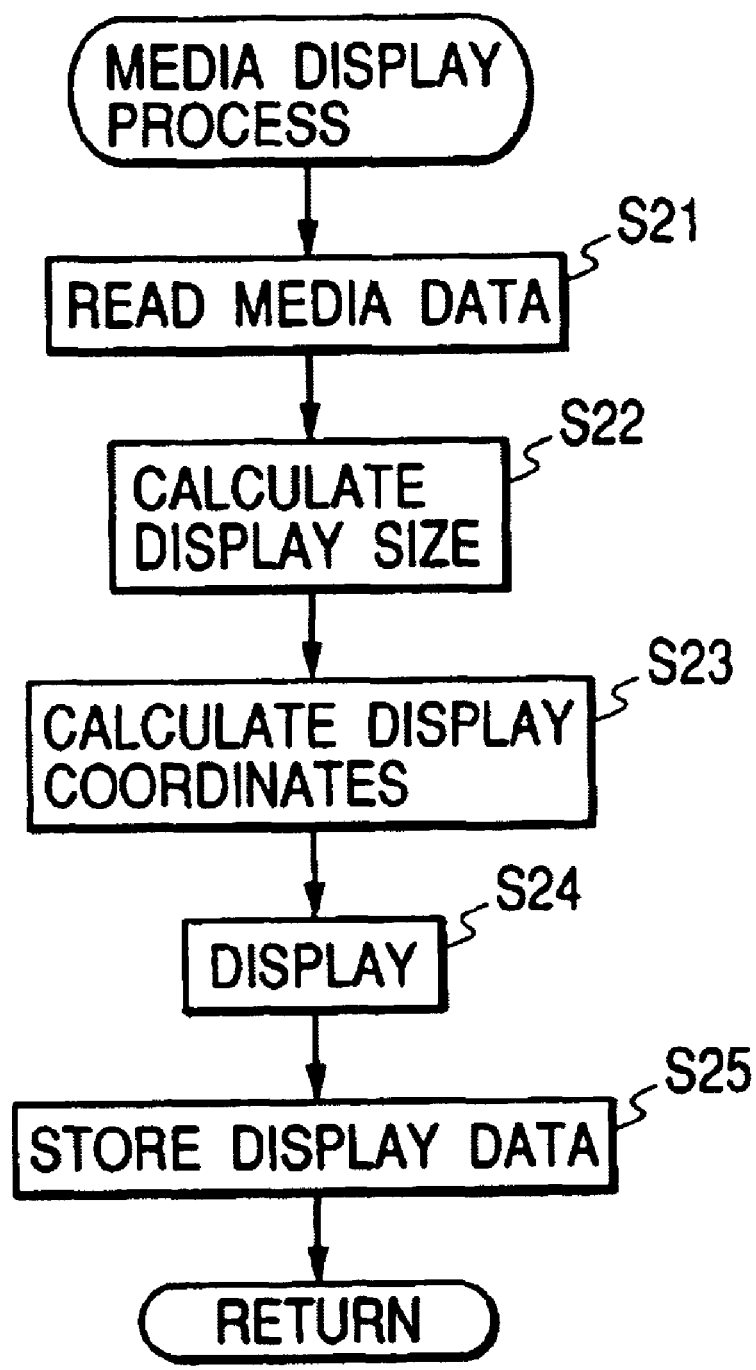
FIG. 10 is a flow chart showing the sequence of media display process.

FIG. 10 is a flow chart showing the details of a media display process in the step S14 of the present embodiment.

A step S21 is a media data reading process for reading the main body of the media data from the database to the RAM, utilizing the media pointer of the selected result data. After the process, the sequence proceeds to a step S22.

A step S22 is a display size calculating process for calculating the display size, on the display, of the media data read in the step S21, based on the base display size VBASE and the matching degree of the result data. The details of this process will be explained later with reference to FIG. 11. After the process the sequence proceeds to a step S23.

A step S23 is a display coordinate calculating process for determining the display coordinate of the media, based on the display size determined in the step S22 and the content of the media display data VDATA. The details of this process will be explained later with reference to FIG. 12. After the process, the sequence proceeds to a step S24.

A step S24 is a display process for displaying the media data with the display size determined in the step S22 and at the display coordinate determined in the step S23. This process is already known, and is commonly employed in the ordinary display system, so that it will not be explained in further details. After the process, the sequence proceeds to a step S25.

A step S25 is a display data storage process for storing the display size determined in the step S22 and the display coordinate determined in the step S23 in the media display data VDATA. After the process, the media display process is terminated.

Figure 11:
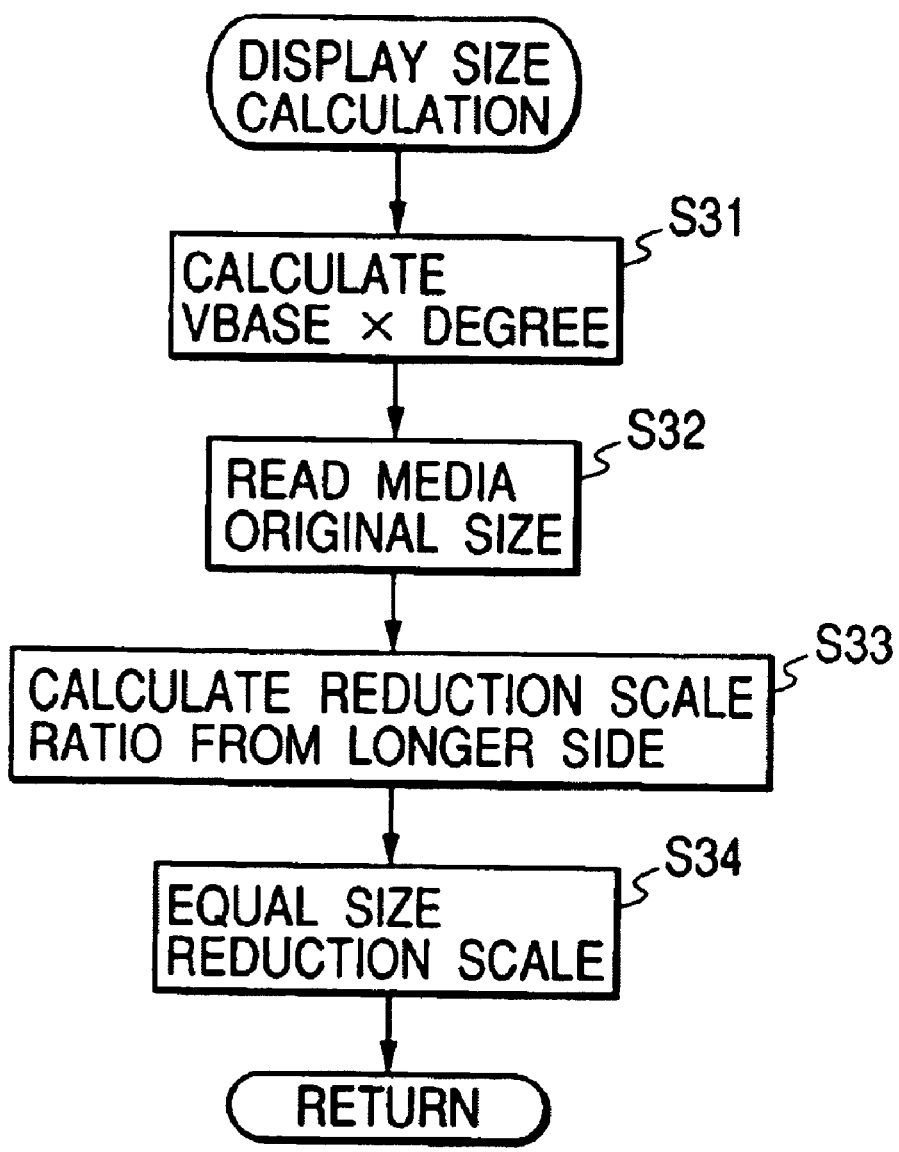
FIG. 11 is a flow chart showing the sequence of display size calculating process.

FIG. 11 is a flow chart showing the details of the display size calculating process in the step S22 of the present embodiment.

A step S31 is a process for determining the product of the display base size VBASE and the language matching degree of the media data to be displayed. The display base size VBASE is suitably set in advance by the number of pixels (dots). As the matching degree stored in the matching result buffer RBUF is represented by percentage, the actual calculation is conducted by VBASE×matching degree/100, and the obtained value indicates the dot size on the longer side in the display of the media data. For example, when the display base size VBASE is selected as 400, the data of the rank 1 in the matching result buffer RBUF shown in FIG. 5, with the matching degree 80, is 400×80/100=320. After the process, the sequence proceeds to a step S32.

A step S32 is a media original size reading process, for reading the original size of the media data to be displayed. After the process, the sequence proceeds to a step S33.

A step S33 is a process for calculating the reduction scale ratio at the display, utilizing the longer side of the original size of the media data read in the step S32 for display. This calculation is conducted in the following manner: reduction ratio=(dot number determined in the step S31/dot number of the longer side in the original size). In the above-cited example, for an original size of 640 in the longer side of the media data, calculation is such that 320/640=0.5. After the process, the sequence proceeds to a step S34.

A step S34 is a process for preparing the display data by varying the vertical and horizontal sizes of the media data to be displayed with a same ratio, utilizing the reduction ratio calculated in the step S33. Such process is already known and widely employed in the image processing, and will not be explained in further details. After the process, the display size calculating process is terminated.

Figure 12:
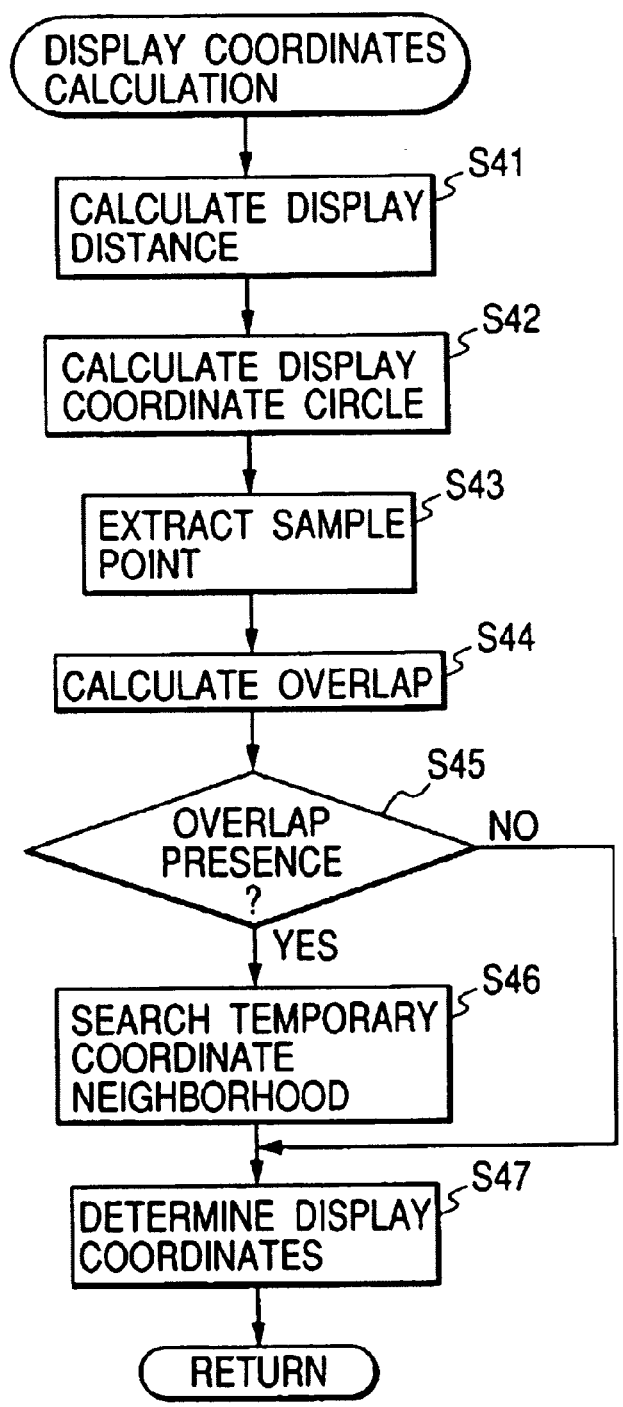
FIG. 12 is a flow chart showing the sequence of display coordinate calculating process.

FIG. 12 is a flow chart showing the details of the display coordinate calculating process in the step S23 of the present embodiment.

A step S41 is a display distance calculating process for determining the distance (dot number) from the original point of the display coordinate system to the display coordinate of the data, based on the gauge determined in the step S11. After the calculation, the sequence proceeds to a step S42.

A step S42 is a display coordinate circle calculating process for calculating the coordinates of points on a circle, having the center at the original point of the coordinate system and having a radius equal to the display distance. This process is already known and is widely employed in the ordinary drawing process, and will not be explained in further details. After the calculation, the sequence proceeds to a step S43.

A step S43 is a process of equally dividing the display coordinate circle determined in the step S42 into a predetermined number and extracting the divided points as sample points. In the present embodiment, the coordinate circle determined in the step S42 is divided into 8 or 12, and 8 or 12 points constituting the dividing points are extracted as the sample points. After the extraction, the display coordinate calculating process is terminated.

A step S44 is an overlap calculating process for calculating the amount of overlap with the already displayed media data, in case of displaying the media with all the sample points extracted in the step S43 as the display coordinates while referring to the display data VDATA. In this process, by executing the overlap calculations for all the sample points, the temporary display coordinate is determined at the sample point with the least overlap. After the determination, the sequence proceeds to a step S45.

A step S45 checks the overlap with other media data in case of selecting the temporary display coordinate determined in the step S44. In the presence of an overlap the sequence proceeds to a step S46, but in the absence of the overlap, the sequence proceeds to a step S47.

A step S46 is a temporary coordinate neighborhood search process for searching, among the points on the display coordinate circle calculated in the step S42, a point showing least overlap with the already displayed media data in the neighborhood of the temporary coordinate determined in the step S44. After the search, the sequence proceeds to a step S47.

A step S47 is a process for determining the coordinate determined in the step S44 or S46 as the display coordinate. After the determination, the display coordinate calculating process is terminated.

Figure 13:
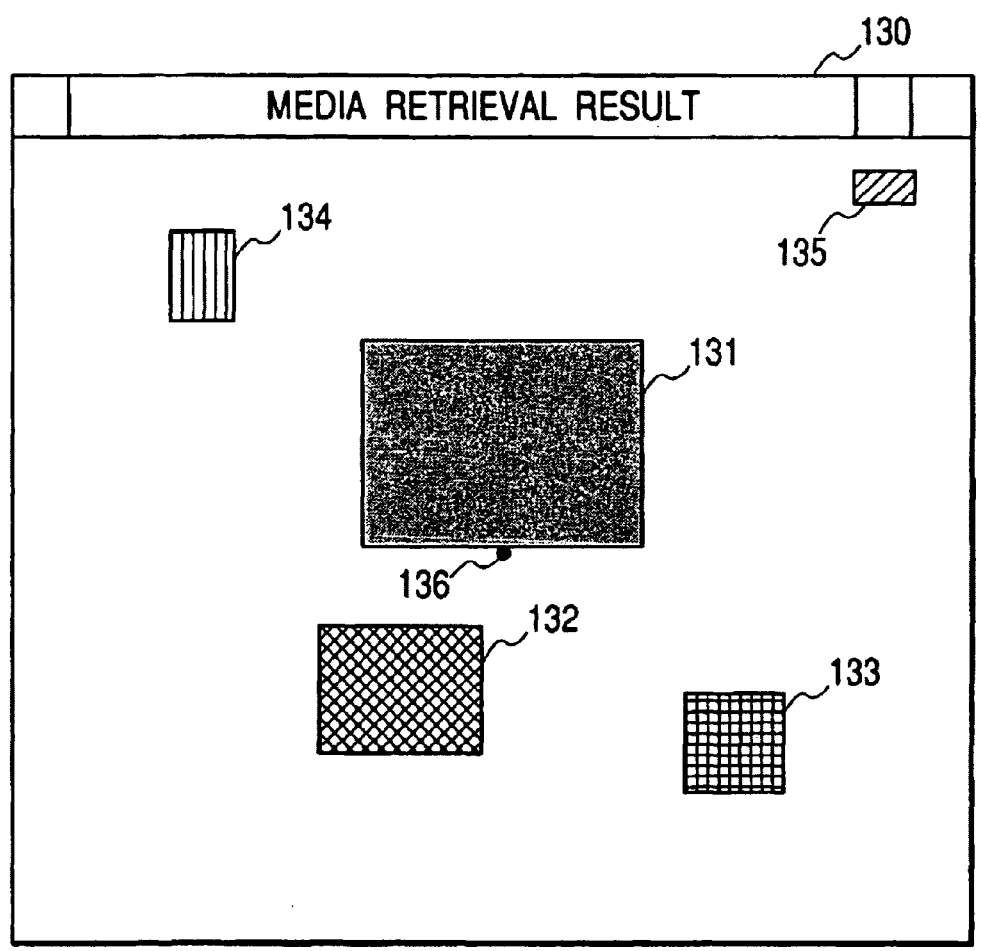
FIG. 13 is a view showing the concept of a media retrieval result display unit.

FIG. 13 shows the image of the retrieval result display unit in the present embodiment.

In FIG. 13 there are shown a retrieval result display unit 130, and various media data 131 to 135. As shown in FIG. 13, in the display unit 130, the data with a larger matching degree is displayed with a larger display size and closer to the center 136 of the display unit 130, so that the user can visually grasp the matching degree. Also the results of retrieval are easy for observation as they are so displayed as to minimize the overlap of the data display areas.

In the present embodiment, as explained in the foregoing, the output is made by converting the degree of language matching directly into the size of the media or the distance from the center of the display unit, whereby the level of matching can be directly understood in the visual manner, and the display is made easier to observe by the arrangement minimizing the overlap. Consequently there can be realized an interface that is more direct and more easily understandable than the conventional one.

Other Embodiments

The present invention is not limited to the embodiment described in the foregoing.

In the foregoing embodiment, the degree of matching is reflected, at the display process, both in the display size of each media data and in the distance from the center, but the degree of matching can be directly understood also by reflection to either of these parameters.

Also in the foregoing embodiment, there has been explained a case where the media data is an image, and such image can naturally be a still image, a moving image or a text. In case of text, the degree of matching may be represented by the font size, instead of the display size of the text image. Also in case of media that cannot be outputted in the visible format, such as audio data, it is possible to define a symbol such as icon representing the media, and to achieve a process similar to the case of image, utilizing the display size of such symbol or the distance thereof from the center of the display. Also in case of audio data, a similar effect can also be obtained by regulating the magnitude of the audio signal outputted to the speaker SPK according to the degree of matching.

Also in the foregoing embodiment, there is employed the degree of matching between the query sentence and the language information corresponding to each media data, but there may also be employed the degree of matching in other retrieving conditions such as that in the pattern matching of image or audio signal, or the number of keywords found in the document retrieval.

Also in the foregoing embodiment, the language information is given separately from the media data, but, if the searched media are text or audio signal, the access for retrieval may be made directly to such data as the language information.

Also in the foregoing embodiment, data are collected by the number of the result output count COUNT in the descending order of the degree of matching, but it is also possible to define a threshold value in the degree of matching and to obtain, among the data of the result output number COUNT, only those of which degree of matching is higher than such threshold value, or to obtain the data of which degree of matching is higher than the threshold value even if the number of such data exceeds the result output number COUNT.

Also in the foregoing embodiment, the PCI bus is employed as the bus of the media retrieval apparatus, but a similar apparatus can be constructed also with an ISA bus or a VL bus.

Also in the foregoing embodiment, the OS is stored in the DISK, but a similar process can be executed also by storing the OS in the ROM.

Also in the foregoing embodiment, there has been explained a case of loading the media retrieval process program and the related data from the CD-ROM directly into the RAM for execution, but it is also possible to once install the media retrieval process program and related data from the CD-ROM into the DISK and loading the program from the DISK into the RAM at the time of execution.

Also in the foregoing embodiment, the media retrieval process program is recorded in the CD-ROM, but there may also be utilized DVD, MO, FD, IC memory card, magnetooptical card etc. It is furthermore possible to record the media retrieval process program in the ROM as a part of the memory map, and to directly execute such program by the CPU.

Also the foregoing embodiment may be realized not only by an apparatus consisting of a single equipment but by a system consisting of plural equipment. Also the foregoing embodiment may be realized by supplying a system or an apparatus with a memory medium storing program codes of a software realizing the functions of the foregoing embodiment, and causing a computer of the apparatus or the system to read and execute the program codes stored in the memory medium.

There is included not only a case where the functions of the foregoing embodiment are directly realized by the computer of the apparatus of the system by reading and executing the program codes stored in the memory medium, but also a case where the above-mentioned functions are realized by the process of the OS or the like functioning on the computer, under the instruction of such program codes.

In these cases, the memory medium storing the program codes constitutes the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information retrieval apparatus comprising:
   calculation means for calculating a degree of coincidence between a search condition being input and each information to be retrieved in a database;
   determination means for determining, on results of retrieval respectively for the plural information to be retrieved of a high degree of coincidence, an output feature amount of each result of retrieval according to each degree of coincidence; and
   output means for outputting said results of retrieval based on each output feature amount, such that information having a higher degree of coincidence is output in a larger size at a position closer to a center of an output part.

2. An information retrieval apparatus according to claim 1, wherein:
   said database stores language information in respective correspondence with each of said information to be retrieved; and
   said calculation means is adapted to execute language analysis of said retrieval condition entered by a natural language, thereby calculating a degree of language coincidence between the result of said language analysis and the language information assigned to each information to be retrieved.

3. An information retrieval apparatus according to claim 1, wherein said output feature amount is a size of the output, and said determination means is adapted to determine a larger output size for a result of a higher degree of coincidence.

4. An information retrieval apparatus according to claim 3, wherein said retrieval result is an image, and said output size is a size of the image.

5. An information retrieval apparatus according to claim 3, wherein said retrieval result is a text, and said output size is a character size of the text.

6. An information retrieval apparatus according to claim 3, wherein said retrieval result is audio data, and said output size is a loudness thereof.

7. An information retrieval apparatus according to claim 1, wherein said retrieval result is an image or a text, and said output feature amount is a display position, and wherein said determination means determines the display position so as to be closer to a specified position for a retrieval result of a higher degree of coincidence.

8. An information retrieval apparatus according to claim 7, wherein said specified position is a center of a display area.

9. An information retrieval apparatus according to claim 7, wherein said determination means determines a distance from said specified position according to said degree of coincidence and determines the display positions of the retrieval results in positions at said determined distances so as to minimize mutual overlap of the retrieval results.

10. An information retrieval apparatus according to claim 1, wherein said determination means determines the output feature amount of each retrieval result, for each of the retrieval results corresponding to the information to be retrieved of a predetermined number in a descending order of the degree of coincidence.

11. An information retrieval apparatus according to claim 1, wherein said determination means determines the output feature amount of each retrieval result for each of the retrieval results corresponding to the information to be retrieved having degrees of coincidence exceeding a predetermined threshold value.

12. An information retrieval method comprising:
- a calculation step of calculating a degree of coincidence between a search condition being input and each information to be retrieved in a database;
- a determination step of determining, on results of retrieval respectively for the plural information to be retrieved of a high degree of coincidence, an output feature amount of each result of retrieval according to each degree of coincidence; and
- an output step of outputting said results of retrieval based on each output feature amount, such that information having a higher degree of coincidence is output in a larger size at a position closer to a center of an output part.

13. An information retrieval method according to claim 12, wherein:
- said database stores language information in respective correspondence with each of said information to be retrieved; and
- said calculation step is adapted to execute language analysis of said retrieval condition entered by a natural language, thereby calculating a degree of language coincidence between the result of said language analysis and the language information assigned to each information to be retrieved.

14. An information retrieval method according to claim 12, wherein said output feature amount is a size of the output, and said determination step is adapted to determine a larger output size for a result of a higher degree of coincidence.

15. An information retrieval method according to claim 14, wherein said retrieval result is an image, and said output size is a size of the image.

16. An information retrieval method according to claim 14, wherein said retrieval result is a text, and said output size is a character size of the text.

17. An information retrieval method according to claim 14, wherein said retrieval result is audio data, and said output size is a loudness thereof.

18. An information retrieval method according to claim 12, wherein said retrieval result is an image or a text, and said output feature amount is a display position and said determination step determines the display position so as to be closer to a specified position for a retrieval result of a higher degree of coincidence.

19. An information retrieval method according to claim 18, wherein said specified position is a center of a display area.

20. An information retrieval method according to claim 18, wherein said determination step determines a distance from said specified position according to said degree of coincidence and determines the display positions of the retrieval results in positions at said determined distances so as to minimize mutual overlap of the retrieval results.

21. An information retrieval method according to claim 12, wherein said determination step determines the output feature amount of each retrieval result, for each of the retrieval results corresponding to the information to be retrieved of a predetermined number, in a descending order of the degree of coincidence.

22. An information retrieval method according to claim 12, wherein said determination step determines the output feature amount of each retrieval result for each of the retrieval results corresponding to the information to be retrieved having degrees of coincidence exceeding a predetermined threshold value.

23. A computer readable storage medium storing an information retrieval program for controlling a computer to perform information retrieval, said program comprising codes for causing the computer to perform:
- a calculation step of calculating a degree of coincidence between a search condition being input and each information to be retrieved in a database;
- a determination step of determining, on results of retrieval respectively for the plural information to be retrieved of a high degree of coincidence, an output feature amount of each result of retrieval according to each degree of coincidence; and
- an output step of outputting said results of retrieval based on each output feature amount, such that information having a higher degree of coincidence is output in a larger size at a position closer to a center of an output part.

* * * * *